US012742474B2

(12) United States Patent
Folkesson

(10) Patent No.: US 12,742,474 B2
(45) Date of Patent: Sep. 22, 2026

(54) AXIAL ROLLER BEARING ASSEMBLY

(71) Applicant: VOLVO TRUCK CORPORATION, Gothenburg (SE)

(72) Inventor: Johan Folkesson, Skene (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 39 days.

(21) Appl. No.: 18/510,892

(22) Filed: Nov. 16, 2023

(65) Prior Publication Data

US 2024/0175466 A1 May 30, 2024

(30) Foreign Application Priority Data

Nov. 29, 2022 (EP) .................................... 22210394

(51) Int. Cl.
*F16C 19/30* (2006.01)
*F16C 33/46* (2006.01)

(52) U.S. Cl.
CPC ........ *F16C 19/305* (2013.01); *F16C 33/4611* (2013.01); *F16C 33/4635* (2013.01); *F16C 2208/60* (2013.01); *F16C 2326/01* (2013.01)

(58) Field of Classification Search
CPC .... F16C 19/305; F16C 33/46; F16C 33/4635; F16C 33/4611; F16C 33/4641; F16C 33/4652; F16C 2208/60
See application file for complete search history.

(56) References Cited

U.S. PATENT DOCUMENTS

| | | | | |
|---|---|---|---|---|
| 3,847,456 | A | 11/1974 | Schwarzbich | |
| 8,807,842 | B2 * | 8/2014 | Salunke | F16C 33/761 384/477 |
| 9,523,239 | B2 | 12/2016 | Watson et al. | |
| 2016/0273585 | A1 * | 9/2016 | Perrotin | F16C 19/10 |

FOREIGN PATENT DOCUMENTS

| | | | | | |
|---|---|---|---|---|---|
| CN | 202108869 | U | | 1/2012 | |
| DE | 1065228 | B | * | 9/1959 | |
| DE | 2144887 | A1 | * | 9/1971 | |
| DE | 4409734 | A1 | * | 1/1995 | F16C 19/30 |
| GB | 1327801 | A | | 8/1973 | |
| JP | 2010116970 | A | * | 5/2010 | F16C 33/4652 |

OTHER PUBLICATIONS

Extended European Search Report in corresponding European Application No. 22210394.7 dated Apr. 24, 2023 (8 pages).
European Communication pursuant to Article 94(3) EPC dated Oct. 2, 2025 in corresponding European Patent Application No. 22210394.7, 6 pages.
Extended European Search Report dated Jun. 9, 2026 in corresponding European Patent Application No. 26171736.7, 8 pages.

* cited by examiner

*Primary Examiner* — John Olszewski
*Assistant Examiner* — Aimee Tran Nguyen
(74) *Attorney, Agent, or Firm* — Jeffri A. Kaminski; Venable LLP

(57) ABSTRACT

An axial roller bearing assembly includes an annular plastic cage comprising a plurality of openings distributed along the circumferential direction of the cage. A plurality of rollers are provided in a respective opening of the cage; and a support ring is provided circumferentially around the outer perimeter of the cage and in contact with the cage for providing strengthening support to the plastic material of the cage.

8 Claims, 10 Drawing Sheets

AXIAL ROLLER BEARING ASSEMBLY

TECHNICAL FIELD

The disclosure relates generally to a bearing assembly. In particular aspects, the disclosure relates to an axial roller bearing assembly. The disclosure can be applied in heavy-duty vehicles, such as trucks, buses, and construction equipment. Although the disclosure may be described with respect to a particular vehicle, the disclosure is not restricted to any particular vehicle.

BACKGROUND

In power transmissions for vehicles it is known to use an axial roller bearing assembly. The allowable speed of an axial roller bearing assembly may be limited partly by the centrifugal forces acting on the rollers and the cage in which the rollers are provided. High centrifugal forces may contribute to failure in at least two scenarios. A first scenario is when the rollers are rolling, typically rotating in respective pockets of the cage, in which case higher speeds cause more frictional heat to be generated between the cage and the rollers, partly due to the increased speed, and partly due to the increased contact pressure between cage and rollers. A second scenario is when the rollers are not rolling (i.e. at rest relative to the cage, i.e. a situation where both thrust surfaces on respective sides of the bearing are rotating with the same speed), in which case no frictional heat is generated, but at some speed, the centrifugal forces will be high enough to simply break the cage.

The cage material may for example be of some kind of plastic material, possibly chosen with focus on reducing the friction coefficient and/or preventing seizure, assuming the first scenario above to be the critical case. However, in some implementation, the first scenario will occur only at low speeds, while the second scenario will occur at much higher speeds (higher centrifugal forces) than the weak plastic cage can handle, and consequently the cage will be broken. Although the cage material could be made of a stronger material, such a change may come with mechanical disadvantages, such as higher friction, and/or higher costs. Thus, there is still room for improvement.

SUMMARY

According to a first aspect of the disclosure, there is provided an axial roller bearing assembly, comprising:

an annular plastic cage comprising a plurality of openings distributed along the circumferential direction of the cage, a plurality of rollers, each roller being provided in a respective opening of the cage, a support ring provided circumferentially around the outer perimeter of the cage and in contact with the cage for providing strengthening support to the plastic material of the cage. The first aspect of the disclosure may seek to counteract the centrifugal forces acting on the relatively weak plastic cage by providing a strengthening support around the cage in order to take up some of the centrifugal forces. A technical benefit may include that the service life of the axial roller bearing assembly can be prolonged as the cage will be less likely to break with the support ring included in the assembly.

It should be noted that although the support ring is in contact with the cage, it does not necessarily mean that the support ring needs to be in tight contact along the entire circumference of the cage. Indeed, there may be some play between the support ring and the cage at one or more areas along the circumference of the cage. It should be understood that the inventor has realized that it is beneficial to use a support ring which can at least partly take up radially outwardly directed forces on the cage in order to prevent the cage from braking, and that this can be implemented with both a tight fit and a fit which allows some play between the cage and the support ring. Thus, depending on the plastic material and dimensioning of the cage, a certain radial expansion of the cage may be allowed without risking braking of the cage.

From the above, it should be understood that, in some examples, the support ring may be press-fitted to the cage. A technical benefit may include that a press-fit provides a stronger and more robust support. However, as understood from above, in some examples, it may suffice to have an assembly in which the support ring is more loosely fitted to the cage. Allowing a looser fit with a very small local radial gap between the support ring and the cage may be beneficial as it may be easier to produce the axial roller bearing assembly, while still enabling a strengthening support to the plastic material of the cage.

The cage may have a circular enveloping surface which defines the outer perimeter of the cage, wherein the support ring may be provided around and in contact with said enveloping surface.

In some examples, the support ring is made of a stronger material than the material of the plastic cage. A technical benefit may include that a stronger material provides improved support. The support ring may, for instance, compared to the cage, have a higher yield point, higher ultimate strength and/or higher fracture point. However, it should be understood that in other examples, the support ring may, for example, have similar strength as the plastic cage. This too will provide some degree of support, and will reduce the risk of the cage braking as compared to the risk when no support ring is present at all.

In some examples, the support ring may be made of metal, such as steel. A technical benefit may include that metal, such as steel, is a readily available material and may be conveniently be formed into a strengthening support ring.

In some examples, the width of the support ring may be smaller than the diameter of any one of the rollers. A technical benefit may include that the axial roller bearing assembly may be used with relatively large thrust surfaces (such as thrust washers). The thrust surfaces that are provided on respective sides of and in contact with the rollers may have a diameter which is equal to or larger than the cage diameter. Because of the relatively small width of the support ring, the support ring does not put any limitation to the diameters of the thrust surfaces. In fact, oversized thrust surfaces, for example in the form of larger diameter thrust washers, may be used for restricting axial movement of the support ring. In such case the support ring does not have to be press-fitted to the cage, by may have a slightly looser fit.

Conversely, in some examples the thrust washers (or other thrust surfaces lying against the rollers) may have a smaller diameter than the diameter of the cage, in which case the width of the support ring may be larger than the width of the cage, and may even be larger than the diameters of the rollers, since it will not interfere with the thrust washers. Such a large width support ring may suitably be press-fitted to the cage.

In some examples the width of the support ring may be equal to or smaller than the width of the cage. A technical benefit may include, similarly to above, that the support ring does not provide any limitation on possible thrust surfaces.

In some examples, the axial roller bearing assembly further comprises comprising:

a first thrust washer, and a second thrust washer, wherein the first thrust washer and the second thrust washer are axially separated from each other and located on opposite sides of the cage, wherein the first thrust washer and the second thrust washer are in contact with said plurality of rollers.

In some examples, the thrust washers have a greater diameter than the cage, thereby restricting axial movement of the support ring. As indicated previously, a technical benefit may include that the support ring does not need to be press-fitted to stay in place, but may have a slight radial play, thereby facilitating the assembling of the axial roller bearing assembly.

In some examples, said outer perimeter of the cage is closed, wherein the cage also has an inner perimeter which is closed, wherein said plurality of openings are provided between said closed outer perimeter and said closed inner perimeter. A technical benefit may include that the closed perimeters increases the strength of the plastic cage. Furthermore, a closed outer perimeter presents an appropriate surface for receiving the support ring.

In some examples, the plastic cage is moulded in one piece. A technical benefit may include that it provides a convenient way to produce the plastic cage. Furthermore, by avoiding seams or other weaker portions of material, the risk of rupturing the cage may be reduced.

In some examples, the plastic cage may be made of polyamide, such as glass fibre reinforced polyamide. A technical benefit may include that polyamide is a relatively strong plastic material, in particular if reinforced. However, in other examples the plastic cage may be made of other plastic materials, such as polyacetal, polyetheretherketone (PEEK), synthetic resin, etc. Glass fibre is a suitable type of reinforcement, however, carbon fibre may be a conceivable alternative reinforcement.

According to a second aspect of the disclosure, there is provided a vehicle comprising the axial roller bearing assembly of the first aspect, including any example thereof. The second aspect of the disclosure may include corresponding technical benefits as those discussed in connection with the axial roller bearing assembly of the first aspect, including any example thereof.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

High centrifugal forces may contribute to failure of axial roller bearing assemblies. When both thrust surfaces on respective sides of the bearing are rotating at the same speed, then the rollers will not be rolling in the cage, but will be substantially at rest. At a certain speed, the centrifugal forces will be high enough to simply break the cage. Although using plastic cages may be desirable in order to reduce friction, they cannot withstand the above-mentioned high centrifugal forces well enough, and can therefore break too easily. Although the cage material could be made of a stronger material, such a change may come with mechanical disadvantages, such as higher friction, and/or higher costs. The inventor has realized that by providing a support ring circumferentially around the outer perimeter of a plastic cage and in contact with the cage, a strengthening support is provided to the plastic material of the cage, improving its resistance to said high centrifugal forces.

Figure 1:
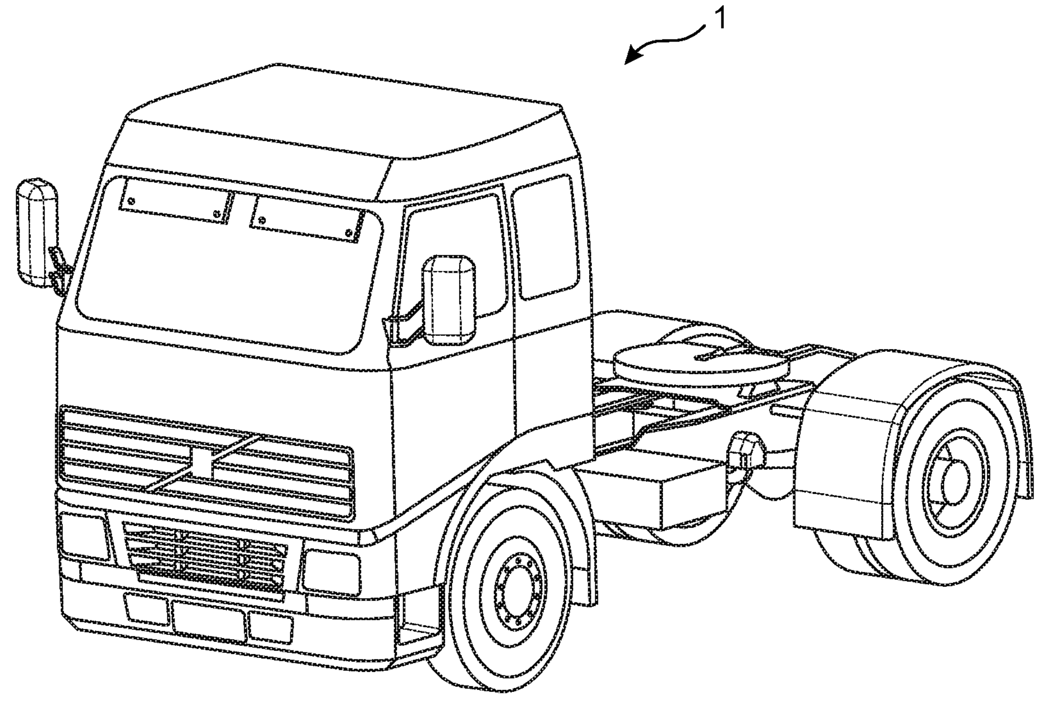
FIG. 1 illustrates a vehicle according to one example of this disclosure.

FIG. 1 illustrates a vehicle 1 according to one example of this disclosure. The exemplary illustration in FIG. 1 shows a heavy-duty vehicle 1. More specifically FIG. 1 shows a vehicle 1 in the form of a tractor unit for towing a trailer unit (not shown), which together may make up a semitrailer vehicle. However, the teachings of the present disclosure are applicable to other types of vehicles as well. For instance, the vehicle may be a different type of vehicle for cargo transport, such as a truck, or a truck with a dolly unit arranged to tow a trailer unit, etc. Other exemplary vehicles include buses, construction equipment, and even passenger cars. The vehicle 1 may be operated by a driver or it may be an autonomous vehicle. The vehicle may comprise an axial roller bearing assembly, examples of which will be discussed in relation to the remaining drawing figures.

Figure 2:
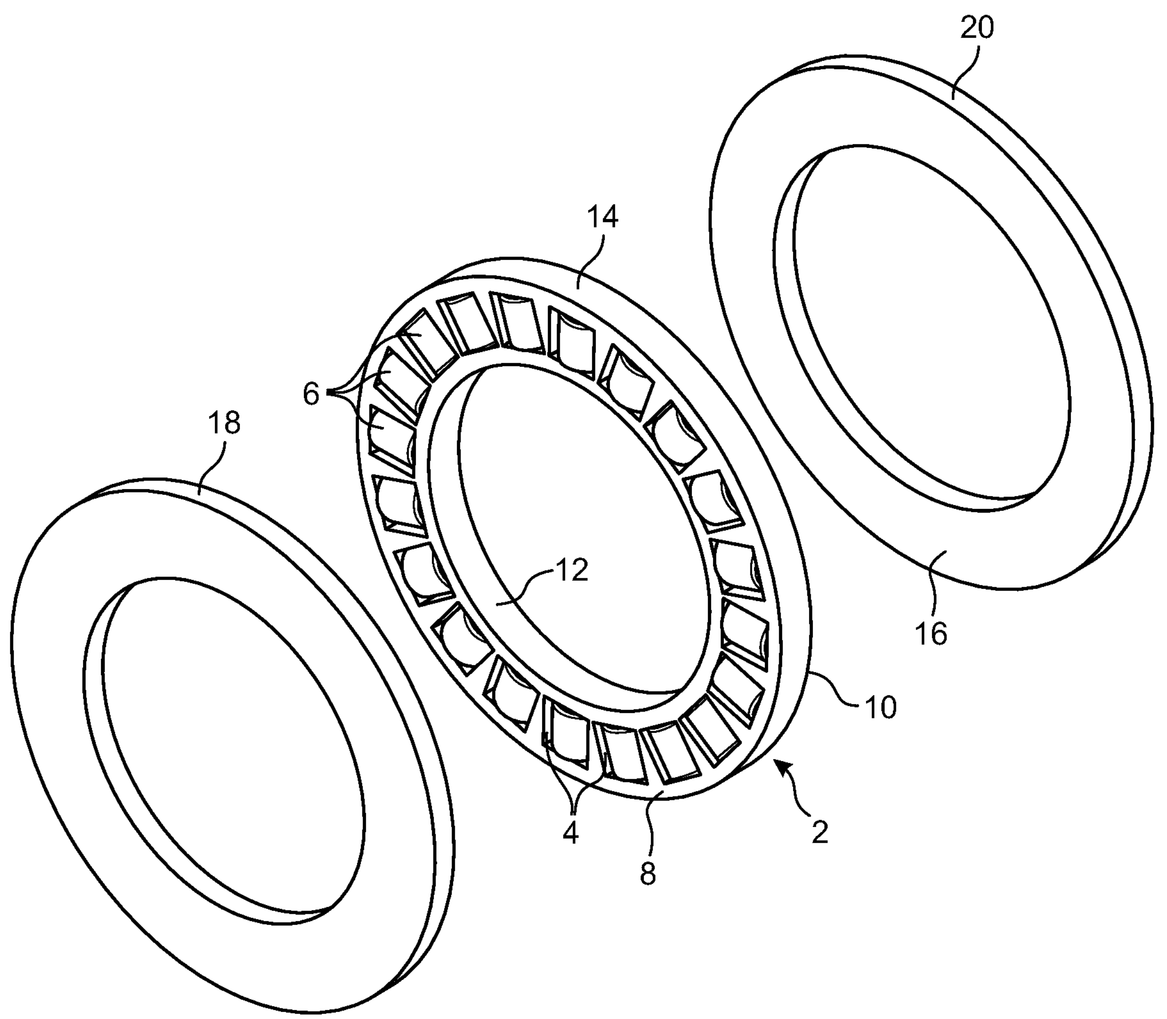
FIGS. 2-4 illustrate components of an axial bearing assembly according to one example of this disclosure.
Figure 3:
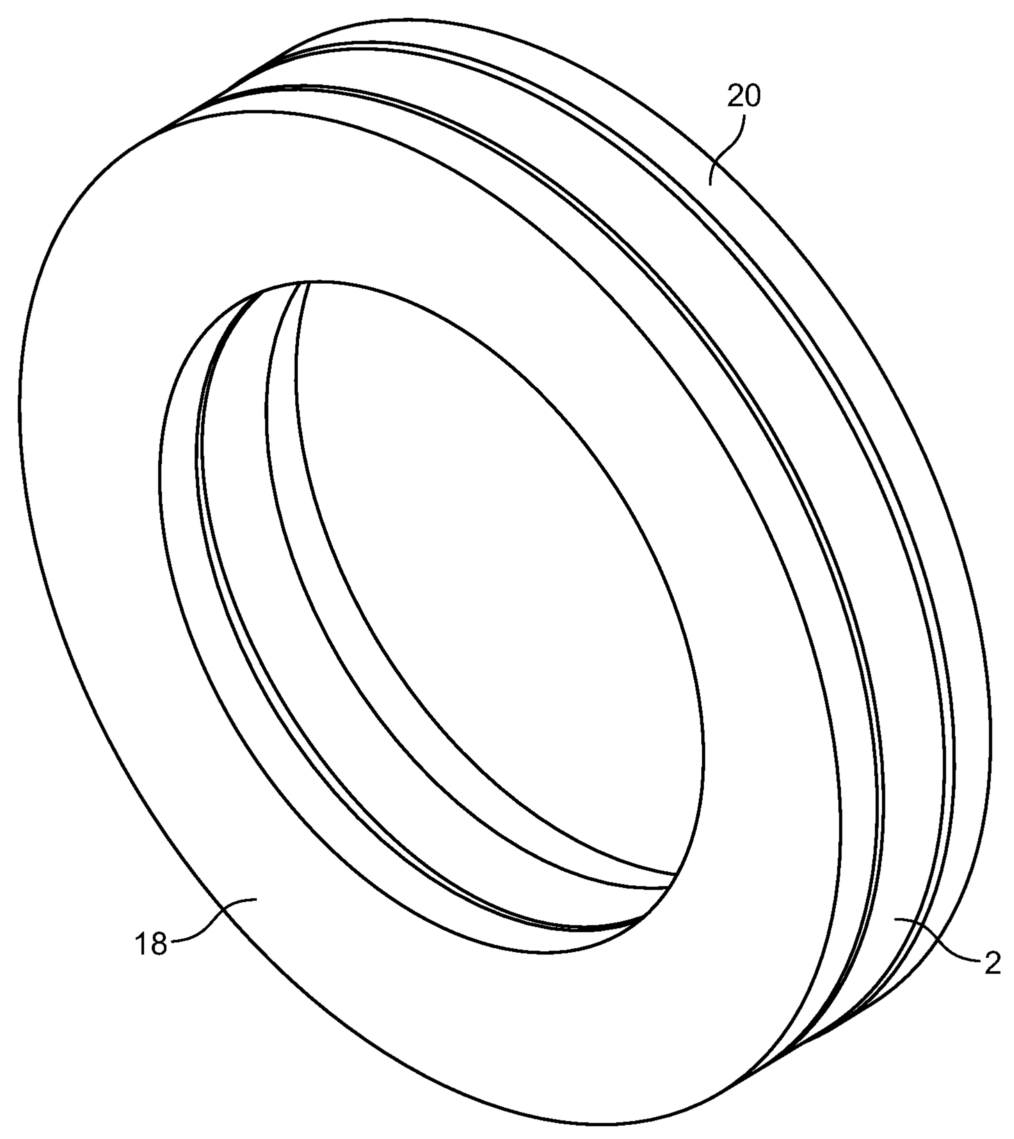
Figure 4:
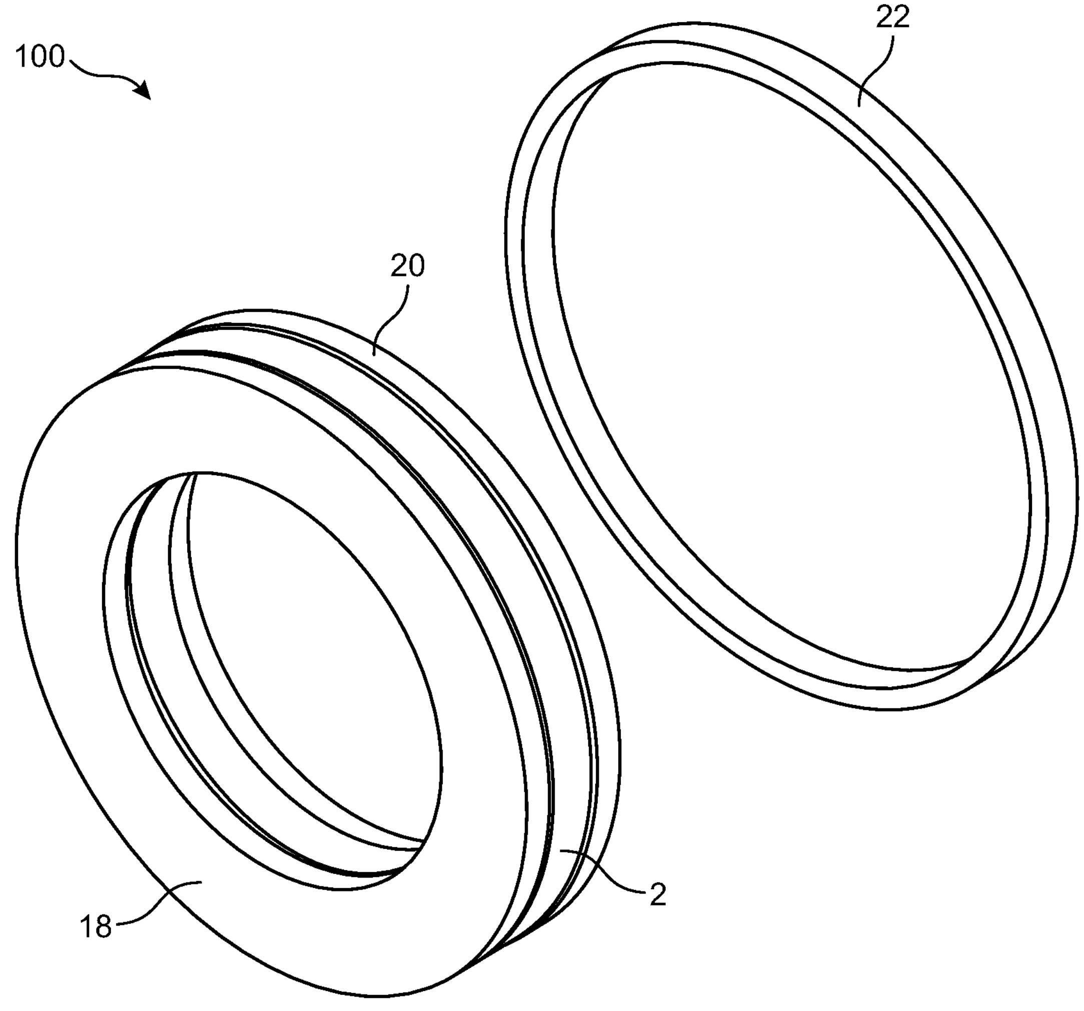

FIGS. 2-4 illustrate components of an axial bearing assembly according to one example of this disclosure. Starting with FIG. 2, there is illustrated an annular plastic cage 2 which comprises a plurality of openings 4 distributed along the circumferential direction of the cage. The openings 4 may also be referred to as pockets. Each opening 4 is provided with a roller 6. Thus, a plurality of rollers 6 are distributed along the circumferential direction of the cage 2. The rollers 6 may suitably be of a metallic material, such as steel. The plastic cage 2 has two opposite sides 8, 10 facing away from each other, and being axially separated by an inner perimeter 12 and an outer perimeter 14 of the plastic cage 2. Thus, in this example, the outer perimeter 14 as well as the inner perimeter 12 of the plastic cage 2 are both closed, such that the plurality of openings 4 are provided between the closed outer perimeter 14 and the closed inner perimeter 12. On both sides of the plastic cage 2, each roller 6 protrudes slightly beyond the sides 8, 10 of the cage such that the rollers 6 present contact surfaces which can receive thrust surfaces 16 on respective sides 8, 10 of the plastic cage 2. In FIG. 2, the thrust surfaces 16 are provided on a first thrust washer 18 and a second thrust washer 20, although thrust surfaces may be provided by other components in other examples of the herein discussed axial roller bearing assembly.

As can be understood from FIG. 2, the first thrust washer 18 and the second thrust washer 20 will, when the axial roller bearing assembly is assembled and in use, be axially separated from each other and located on opposite sides of the plastic cage 2. The first thrust washer 18 and the second thrust washer 20 will be in contact with said plurality of rollers 6. Suitably, the first thrust washer 18 and the second thrust washer 20 will not be in contact with the plastic cage 2 that holds the rollers 6. FIG. 3 illustrates the relation between the first thrust washer 18, the plastic cage 2 with its rollers 6 (which are concealed by the first thrust washer 18 in FIG. 3) and the second thrust washer 20 in an in-use state, however, it should be noted that FIG. 3 does not illustrate the entire assembled axial roller assembly.

Figure 5:
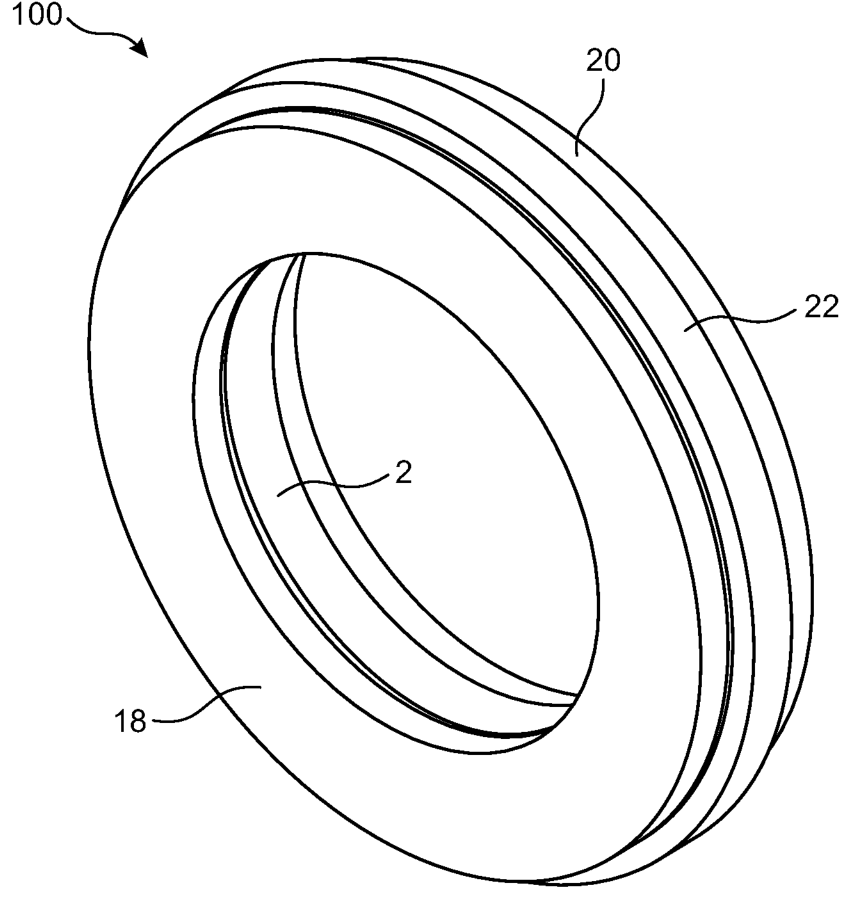
FIG. 5 illustrates an axial bearing assembly according to one example of this disclosure.

FIG. 4 illustrates that, in addition to the components discussed in relation to FIGS. 2-3, an axial roller bearing assembly 100 of an example of the present disclosure also comprises a support ring 22. As illustrated in FIG. 5, in an assembled state of the axial roller bearing assembly 100, the support ring 22 is provided circumferentially around the outer perimeter of the plastic cage 2 and in contact with the plastic cage 2. This provides strengthening support to the plastic material of the cage 2. Thus, even though the plastic cage 2 may become subjected to high centrifugal forces, the plastic cage 2 will be less likely to break compared to if the axial roller bearing assembly 100 would have lacked the support ring 22.

Figure 6:
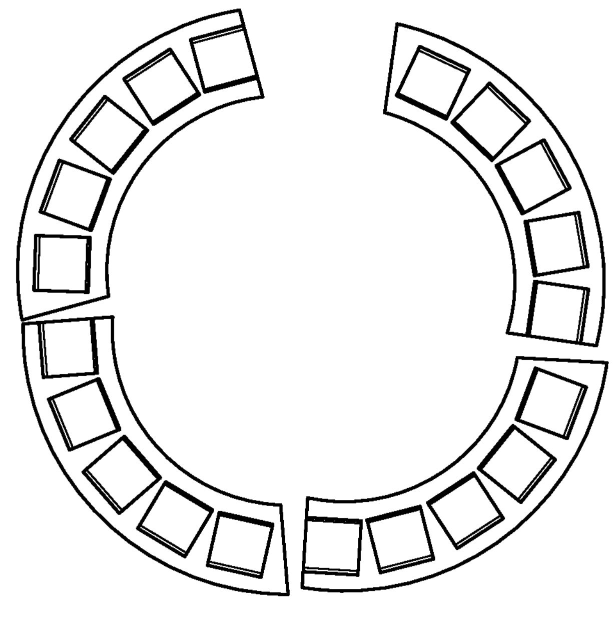
FIGS. 6-7 illustrate a technical benefit of an axial bearing assembly according to one example of this disclosure.
Figure 7:
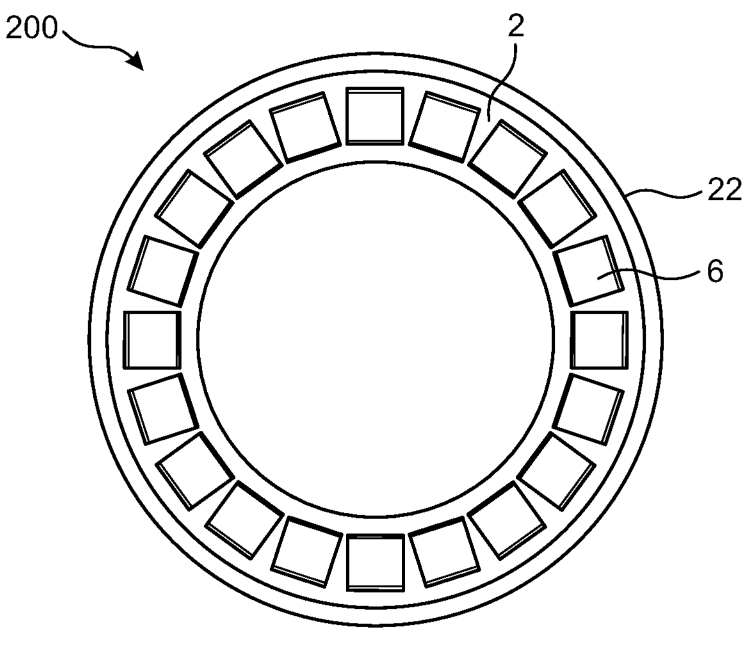

FIGS. 6-7 illustrate a technical benefit of an axial bearing assembly according to one example of this disclosure. FIG. 6 illustrates that without a support ring, a plastic cage of an axial roller bearing assembly runs the risk of breaking at multiple locations along the circumference of the cage, when subjected to high centrifugal forces. In contrast, in an axial roller bearing assembly 200 according to an example of the present disclosure, due to the provision of the support ring 22, the plastic cage 2 can better withstand the high centrifugal forces, and thus be less likely to break.

It should be understood that in some examples, thrust surfaces and/or thrust washers having thrust surfaces may be considered to be included in the axial roller bearing assembly of the present disclosure. In other examples the thrust surfaces and/or thrust washers may be considered as not forming part of the actual axial roller bearing assembly, but rather considered to form separate parts with which the axial roller bearing assembly may be configured to interact.

Various types of material are conceivable for the support ring. A support ring made of a material having substantially the same strength as the plastic cage will also be beneficial as the mere circumferential provision of the support ring provides some degree of support and improved resistance to withstand the high centrifugal forces. Nevertheless, the support ring may advantageously be made of a stronger material than the material of the plastic cage. For instance, the support ring may suitably be made of a metallic material, such as steel.

In the example shown in FIGS. 5 and 7, the support ring 22 may suitably be press-fitted to the plastic cage 2. Furthermore, as can be seen from the drawings, the width of the support ring 22. i.e. its axial extension, may suitably be smaller than the diameter of any one of the rollers 6. Hereby, the support ring 22 will not interfere with the thrust surfaces that contact the rollers 6. For additional safety measure, to avoid such interfering, the width of the support ring 22 may suitably be equal to or smaller than the width of the cage 2, as can be seen in FIGS. 4 and 5.

Although a press-fitted support ring provides good strengthening to the plastic cage, even a slightly more loosely fitted support ring is also a conceivable solution. An advantage of a more loosely fitted support ring is that it may result in easier assembling of the axial roller bearing assembly. Although in such solutions there may be some play locally between some part of the support ring and the plastic cage which it surrounds and contacts, the support ring will still counteract an outwardly directed force well enough to keep the plastic cage from rupturing. Thus, due to the presence of the support ring, the material of the plastic cage may still be prevented from overexpansion in the radial direction.

Figure 8:
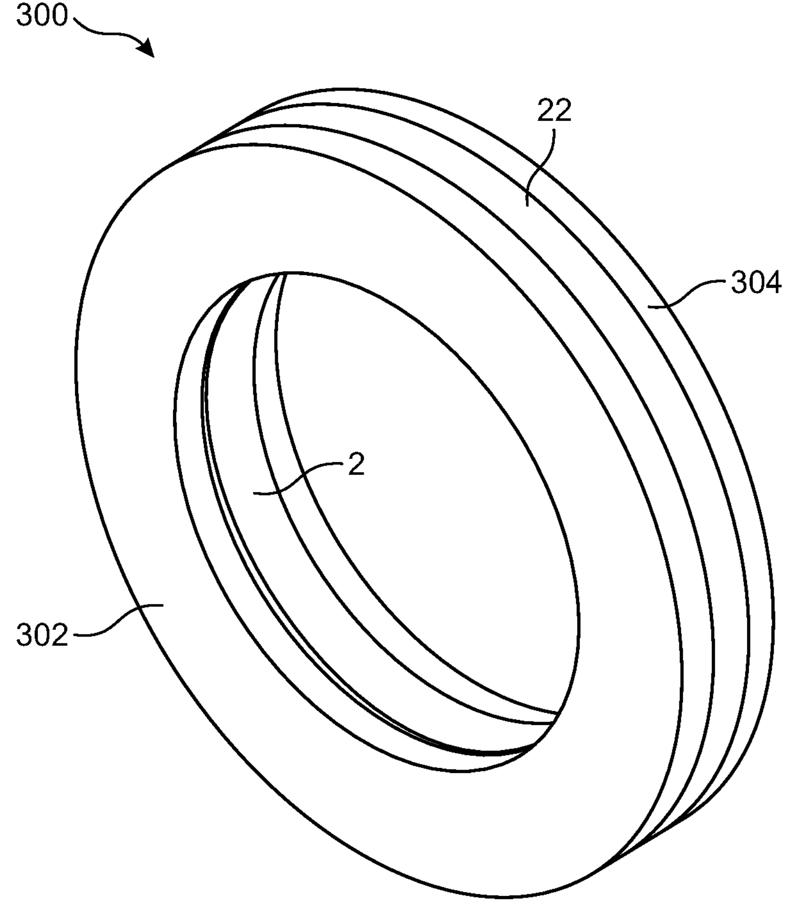
FIG. 8 is an illustration of an axial bearing assembly according to at least another example of this disclosure.

FIG. 8 is an illustration of an axial bearing assembly 300 according to another example of this disclosure. In this example, the first thrust washers 302 and the second thrust washer 304 have a greater diameter than the plastic cage 2. This means, that even if the support ring 22 is mounted with some play being present, the thrust washers 302, 304 will restrict axial movement of the support ring 22. It should, however, be understood that having slightly oversized thrust washers 302, 304 as illustrated in FIG. 8 may also be combined with a press-fitted support ring 22. When comparing the example in FIG. 8 with the example in FIG. 5, you can see that in FIG. 8, the relative large thrust washers 302, 304 have and outer perimeter aligned with the outer perimeter of the support ring 22, whereas in FIG. 5, the outer perimeter of the support ring 22 lies beyond the outer perimeter of the thrust washers 18, 20.

For any example of the axial roller bearing assembly discussed herein, such as the examples discussed in FIGS. 5, 7 and 8, the plastic cage may suitably be moulded in one piece. The plastic cage may, e.g. be made of polyamide, such as glass fibre reinforced polyamide.

Figures 9, 10, 11:
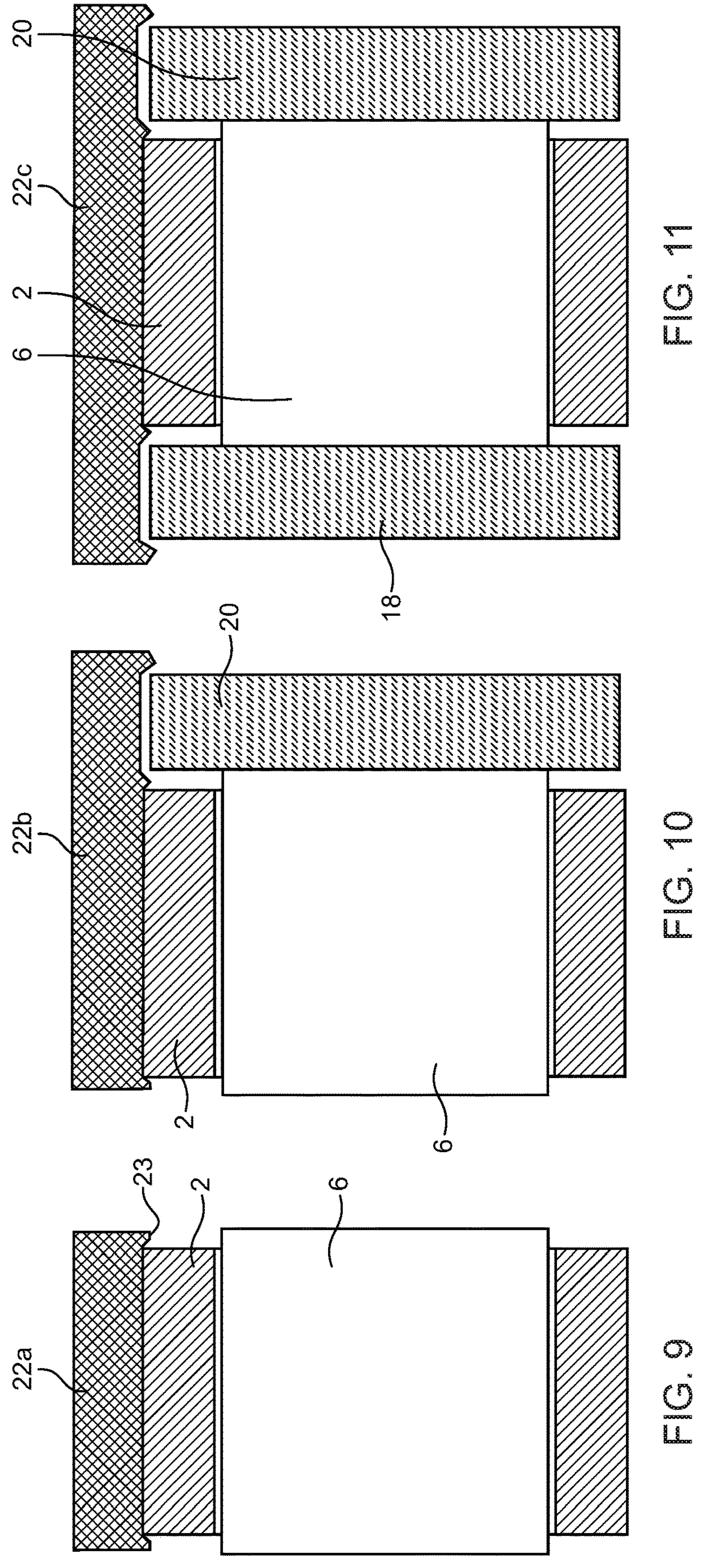
FIGS. 9-13 illustrate different conceivable configurations of a support ring, according to at least one example of this disclosure.
Figure 12:
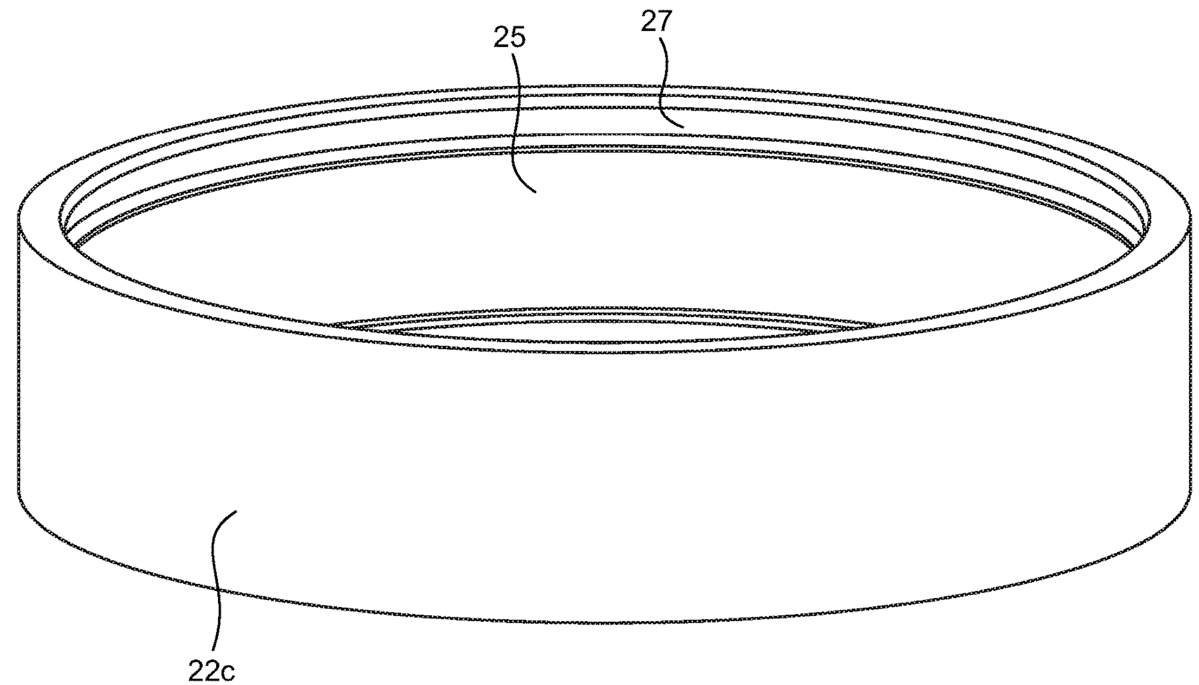
Figure 13:
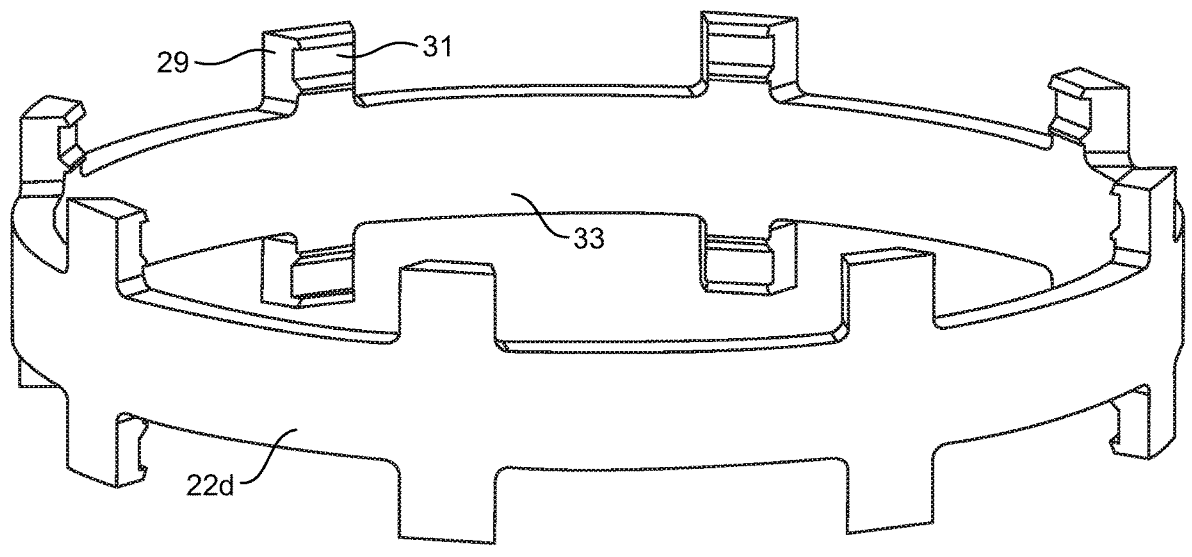

FIGS. 9-13 illustrate different conceivable configurations of a support ring, according to at least one example of this disclosure. Starting with FIG. 9, a cross-sectional view of a periphery of an axial roller assembly is illustrated. Thus, in FIG. 9 you can see one of the rollers 6 in the cage 2, and a support ring 22*a* around the cage 2. The support ring 22*a* has radially inwardly projecting edges 23. These edges 23 facilitate positioning of the support ring 22*a* around the cage 2 during assembling, and also function as stops against axial movement of the support ring 22*a* when the axial roller bearing assembly is in use. FIG. 10 illustrates that the support ring 22*b* is wider than the support ring 22*a* in FIG. 9. Furthermore, the support ring 22*b* in FIG. 10 is provided with and additional inwards projection, whereby a track is created for a thrust washer 20. The thrust washer 20 can hereby be held in place by the support ring 22*b* during handling and assembling, but should suitably not be in contact with the support ring 22*b* during operation. FIG. 11 illustrates an even wider support ring 22*c* which can confine two thrust washers 18, 20 for handling and assembling purposes. FIG. 12 illustrates a perspective view of the support ring 22*c* in FIG. 11. Here in FIG. 12 a track 25 for positioning the cage and another track 27 for positioning one of the thrust washers can be seen. FIG. 13 illustrates another perspective view of another example of a support ring 22*d*, in which the support ring 22*d* is provided with interrupted/partial positioning features 29 presenting tracks 31 for the thrust washers and a track 33 for the cage. In comparison with the support ring 22*c* of FIG. 12, the support ring 22*d* of FIG. 13 requires less force to snap the cage and/or thrust washers into place.

The terminology used herein is for the purpose of describing particular aspects only and is not intended to be limiting of the disclosure. As used herein, the singular forms "a." "an," and "the" are intended to include the plural forms as well, unless the context clearly indicates otherwise. As used herein, the term "and/or" includes any and all combinations of one or more of the associated listed items. It will be further understood that the terms "comprises," "comprising." "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. An axial roller bearing assembly, comprising:

an annular plastic cage comprising a plurality of openings distributed along the circumferential direction of the cage, a plurality of rollers, each roller being provided in a respective opening of the cage, a support ring provided circumferentially around the outer perimeter of the cage and in direct contact with the cage for providing strengthening support to the plastic material of the cage, wherein the plastic cage is moulded in one integral piece, wherein the support ring has respective radially inwardly projecting edges at its axial ends to facilitate positioning of the support ring around the cage during assembling, and to also function as stops against axial movement of the support ring when the axial roller bearing assembly is in use, wherein the support ring is provided with an additional inwards projection between its axial ends to cooperate with a respective one of the inwardly projection edges at the axial end to form a track for a thrust washer, whereby the thrust washer can be held in place by the support ring.

2. The axial roller bearing assembly of claim 1, wherein said support ring is made of a stronger material than the material of the plastic cage.

3. The axial roller bearing assembly of claim 1, wherein the support ring is made of metal.

4. The axial roller bearing assembly of claim 1, wherein the support ring is press-fitted to the cage.

5. The axial roller bearing assembly of claim 1, further comprising:

a first thrust washer, and a second thrust washer, wherein the first thrust washer and the second thrust washer are axially separated from each other and located on opposite sides of the cage, wherein the first thrust washer and the second thrust washer are in contact with said plurality of rollers.

6. The axial roller bearing assembly of claim 1, wherein said outer perimeter of the cage is closed, and wherein the cage also has an inner perimeter which is closed, wherein said plurality of openings are provided between said closed outer perimeter and said closed inner perimeter.

7. The axial roller bearing assembly of claim 1, wherein the plastic cage is made of polyamide.

8. A vehicle comprising the axial roller bearing assembly of claim 1.

* * * * *